United States Patent
Hicks et al.

(10) Patent No.: US 11,027,495 B2
(45) Date of Patent: Jun. 8, 2021

(54) OBJECT TEXTURIZER

(71) Applicant: International Business Machines Corporation, Armonk, NY (US)

(72) Inventors: Andrew Hicks, Wappingers Falls, NY (US); Miles C. Pedrone, Wappingers Falls, NY (US); Tynan J. Garrett, Poughkeepsie, NY (US); Michael Peter Lyons, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 16/453,626

(22) Filed: Jun. 26, 2019

(65) Prior Publication Data
US 2020/0406555 A1 Dec. 31, 2020

(51) Int. Cl.
*B29C 64/393* (2017.01)
*B33Y 30/00* (2015.01)
*B29C 64/20* (2017.01)
*B33Y 50/02* (2015.01)

(52) U.S. Cl.
CPC ............ *B29C 64/393* (2017.08); *B29C 64/20* (2017.08); *B33Y 30/00* (2014.12); *B33Y 50/02* (2014.12)

(58) Field of Classification Search
CPC ....... B29C 64/393; B29C 64/20; B33Y 50/02; B33Y 30/00
See application file for complete search history.

(56) References Cited

U.S. PATENT DOCUMENTS

| | | |
|---|---|---|
| 6,305,769 B1 | 10/2001 | Thayer et al. |
| 6,357,855 B1 | 3/2002 | Kerekes et al. |
| 6,572,807 B1 | 6/2003 | Fong |
| 8,991,211 B1 | 3/2015 | Arlotti et al. |
| 9,038,422 B2 | 5/2015 | Wanveer |
| 9,339,972 B2 | 5/2016 | Gordon et al. |
| 9,868,871 B2 | 1/2018 | Liu et al. |

(Continued)

FOREIGN PATENT DOCUMENTS

| | | |
|---|---|---|
| CN | 104626590 B | 2/2017 |
| CN | 106739745 A | 5/2017 |

(Continued)

OTHER PUBLICATIONS

Andreas Bastian, "3D Print Finishing Technique for Improved Surface Quality",2016, online retrieved, URL <http://www.instructables.com/id/3D-Print-Finishing-Technique-for-Improved-Surface-/>,7 pages.

(Continued)

*Primary Examiner* — Nahida Sultana
(74) *Attorney, Agent, or Firm* — Cantor Colburn LLP; Teddi Maranzano

(57) ABSTRACT

A texturizer is provided and includes an extension arm and fine and gross motor controllers. The fine motor controller includes a heating element, one or more texturizing tools and a fine motor which is operable to control respective positions and orientations of the heating element and the one or more texturizing tools. The gross motor controller is interposed between the extension arm and the fine motor controller and is operable to control a position and an orientation of the fine motor controller relative to the extension arm.

20 Claims, 4 Drawing Sheets

(56) References Cited

U.S. PATENT DOCUMENTS

| | | | |
|---|---|---|---|
| 10,029,937 | B2 | 7/2018 | Van Pelt |
| 10,780,628 | B2* | 9/2020 | Padgett .................. B29C 64/295 |
| 2009/0148813 | A1 | 6/2009 | Sun et al. |
| 2012/0231232 | A1 | 9/2012 | Xu et al. |
| 2014/0295816 | A1* | 10/2014 | Papakipos ............... H04L 67/00 |
| | | | 455/418 |
| 2015/0059409 | A1 | 3/2015 | Ravel et al. |
| 2015/0298393 | A1 | 10/2015 | Suarez |
| 2016/0303807 | A1 | 10/2016 | Diamante |
| 2017/0043532 | A1 | 2/2017 | Carr et al. |
| 2017/0066194 | A1 | 3/2017 | Bromer |
| 2017/0081236 | A1 | 3/2017 | Klein et al. |
| 2017/0240675 | A1 | 8/2017 | Yoshimura |
| 2017/0255714 | A1 | 9/2017 | Yoon et al. |
| 2017/0312987 | A1* | 11/2017 | Ladanyi ................. B29C 64/393 |
| 2018/0257303 | A1 | 9/2018 | Bostick et al. |
| 2018/0290194 | A1* | 10/2018 | Jabbari ................. B21C 37/045 |
| 2019/0084861 | A1 | 3/2019 | Takahashi et al. |
| 2019/0091933 | A1 | 3/2019 | Barbati et al. |

FOREIGN PATENT DOCUMENTS

| | | |
|---|---|---|
| WO | 2018002001 A1 | 1/2018 |
| WO | 2018077712 A1 | 5/2018 |

OTHER PUBLICATIONS

Andrew Liszewski, "A New 3D Printing Support Filament Easily Dissolves Away in Water", Jul. 14, 2015, Retrieved from URL:<https://gizmodo.com/a-new-3d-printing-support-filament-easily-dissolves-awa-1717688742>, 3 pages.

Anonymous (Mar. 2017). The Ultimate Guide to Stereolithography (SLA) 3D Printing. Retrieved from URL <https://formlabs.com/blog/ultimate-guide-to-stereolithography-sla-3d-printing/>, 25 pages.

Dave Evan, "Ultimate Guide to Finishing 3D Printed Parts", Jan. 28, 2017, online retrieved, URL <https://www.fictiv.com/hwg/fabricate/ultimate-guide-to-finishing-3d-printed-parts>, 21 pages.

Disclosed anonymously (Sep. 2014). System and Method to Print Unique Versions of 3D Objects by Dynamically Altering Relative Attributes. IPCOM000238607D, 5 pages.

Heidi Hoopes, "3D-printed materials that change texture on demand", Jun. 12, 2015, Online retrieved, URL <http://newatlas.com/3d-printing-surfaces-texture-dynamic/37985/#gallery>, 2 pages.

Jean Le Bouthillier, "Heat Beds in 3D Printing—Advantages and Equipment", Mar. 13, 2016, URL <http://oootsindustries.com/heat-bed-3d-printing/>, 13 pages.

Klein et al., "3D Printing of Transparent Glass",Hewlett-Packard Development Company, L.P, 2012, 4 pages.

Li et al., "Increasing the functionalities of 3D printed microchemical devices by single material, multimaterial, and print-pause-print 3D printing", Royal Society of Chemistry, Lab Chip, 2019, 19, 35-49.

Sun, et al. "A review on 3D Printing for Customized Food Fabrication", Procedia Manufacturing, 2015, vol. 1, pp. 308-319.

Wang, W., Wang, T. Y., Yang, Z., Liu, L., Tong, X., Tong, W., ... & Liu, X. (2013). Cost-effective printing of 3D objects with skin-frame structures. ACM Transactions on Graphics (TOG), 32(6), 177.

Whiteclouds, "3D Textures",2016, online retrieved, URL <https://www.whiteclouds.com/3dpedia-index/3d-textures>,2 pages.

Encyclopaedia Britannica (2019) Resin—Chemical Compound. Retrieved from URL <https://www.britannica.com/science/resin>, 2 pages.

\* cited by examiner

OBJECT TEXTURIZER

BACKGROUND

The present invention generally relates to an object texturizer, and more specifically, to an object texturizer for adding texture to additively manufactured objects.

Additive manufacturing, or three-dimensional (3D) printing, is typically conducted in a 3D printer or another similar device and involves the deposition and curing or hardening of material in patterned layers to form a 3D printed object. Most 3D printers include a housing, a printing bed disposed in the housing, a printing head, nozzle or dispenser that dispenses the material onto the printing bed and then onto subsequent layers, a curing or hardening element that cures or hardens the material and a controller system. The control system controls the position and orientation of the printing head, nozzle or dispenser as well as the position and orientation of the curing or hardening element. In this way, the 3D printed object can be provided with various, oftentimes complex geometries.

SUMMARY

Embodiments of the present invention are directed to a texturizer. A non-limiting example of the texturizer includes an extension arm and fine and gross motor controllers. The fine motor controller includes a heating element, one or more texturizing tools and a fine motor which is operable to control respective positions and orientations of the heating element and the one or more texturizing tools. The gross motor controller is interposed between the extension arm and the fine motor controller and is operable to control a position and an orientation of the fine motor controller relative to the extension arm.

Embodiments of the present invention are directed to an additive manufacturing device. A non-limiting example of the additive manufacturing device includes a housing that includes a printing bed, an additive manufacturing head configured to additively manufacture an object on the printing bed and a texturizer. The texturizer includes an extension arm, which is movable relative to the printing bed, and fine and gross motor controllers. The fine motor controller includes a heating element, one or more texturizing tools and a fine motor which is operable to control respective positions and orientations of the heating element and the one or more texturizing tools relative to the object. The gross motor controller is interposed between the extension arm and the fine motor controller and is operable to control a position and an orientation of the fine motor controller relative to the extension arm.

Embodiments of the present invention are directed to a method of operating a texturizer of an additive manufacturing device. A non-limiting example of the method includes positioning a fine motor controller relative to an object. The fine motor controller includes a heating element, an additive manufacturing tool and one or more subtractive manufacturing tools. The method further includes positioning one of the one or more subtractive manufacturing tools in a current use position and stowing the others of the one or more subtractive manufacturing tools and operating at least one of the heating element, the additive manufacturing tool and the one of the one or more subtractive manufacturing tools in the current use position in accordance with a texturizing algorithm for the object.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
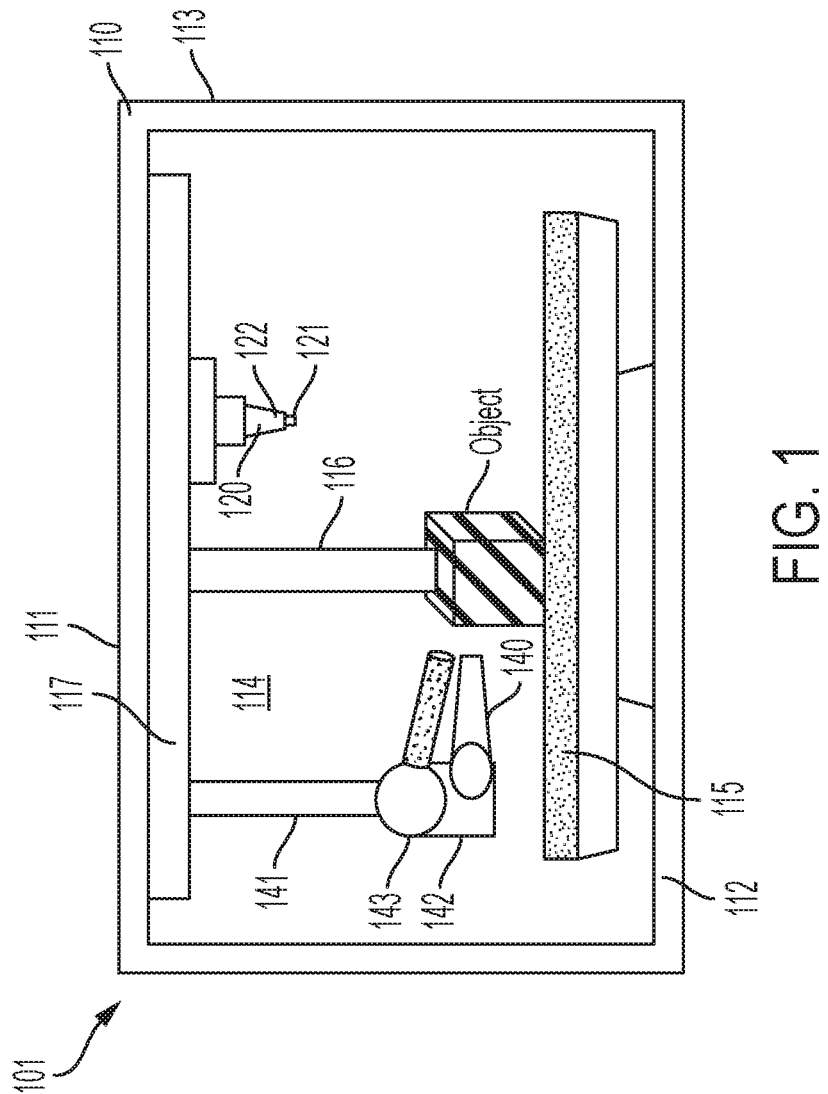
FIG. 1 is a side view of an additive manufacturing device in accordance with embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

As will be described herein, a texturizer is provided and includes an extension arm and fine and gross motor controllers. The fine motor controller includes a heating element, one or more texturizing tools and a fine motor which is operable to control respective positions and orientations of the heating element and the one or more texturizing tools. The gross motor controller is interposed between the extension arm and the fine motor controller and is operable to control a position and an orientation of the fine motor controller relative to the extension arm.

Turning now to an overview of technologies that are more specifically relevant to aspects of the invention, 3D printing can be used for making components of industrial equipment, toys, art, etc. However, due to the nature of 3D printing whereby materials are dispensed in patterned layers and cured or hardened, the expression and depth of certain printed objects can be limited. For example, while 3D printing can produce components of varied shapes and sizes, 3D printing is typically incapable of providing textures surfaces for those components.

Turning now to an overview of the aspects of the invention, one or more embodiments of the invention that address the above-described shortcomings of the prior art provide for a printing head with particular tools that give the printing head the capability of texturizing an object.

The above-described aspects of the invention address the shortcomings of the prior art by providing for an object texturizer that can be lowered and brought into close proximity to an object whereupon the object texturizer can heat the object to a predefined temperature at which texturizing tools can be used to add texture to the object. The texturizing tools can have variable functions and usage modes and can be extended or retracted as needed for a given texturizing operation. For example, the texturizing tools can all be stored on a rotating head and, when a texturizing tool is not needed, it can be retracted and a correct tool can be rotated into place. The rotating head can be operated by additional fine and gross motors.

Figure 2:
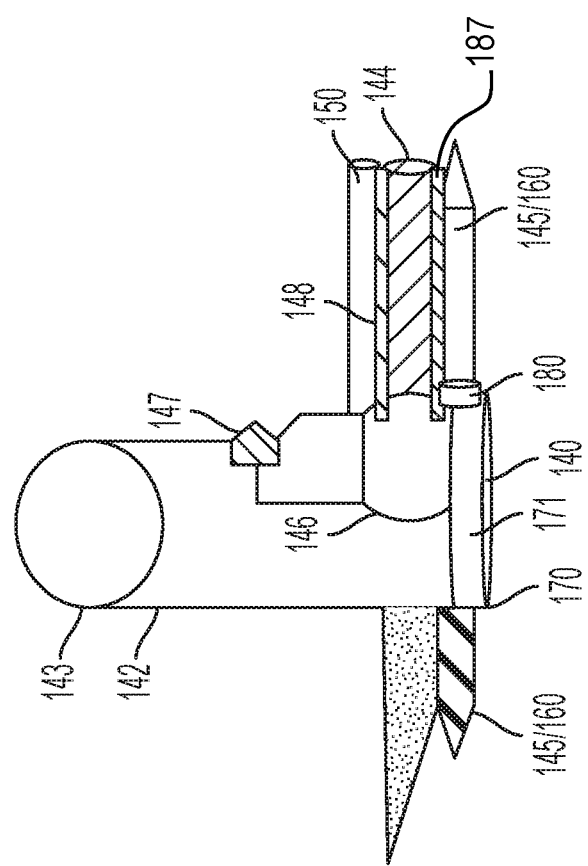
FIG. 2 is an enlarged side view of a texturizer of the additive manufacturing device in accordance with embodiments of the present invention.

Turning now to a more detailed description of aspects of the present invention, FIGS. 1 and 2 depict an additive manufacturing device 101. As shown in FIG. 1, the additive manufacturing device 101 includes a housing 110, an additive manufacturing head 120 and a texturizer 140. The housing 110 includes top and bottom sides 111 and 112 and sidewalls 113 that are formed to define an interior 114. The housing 110 further includes a printing bed 115 disposed within the interior 114, an optional object stabilization arm 116 that is configured to maintain a position of an object on the printing bed 115 and a track 117. The additive manufacturing head 120 is configured to additively manufacture the object on the printing bed 115 and can include an additive manufacturing head element 121, which is configured to dispense material of the object, and a curing or hardening element 122, which is configured to cure or harden the material of the object. The track 117 is configured to support the additive manufacturing head 120 and the texturizer 140 within the interior 114 and to position the additive manufacturing head 120 and the texturizer 140 relative to the printing bed 115 and/or the object. That is, the track 117 is configured to move and/or rotate the additive manufacturing head 120 and the texturizer 140 in multiple directions, such as side-to-side and up and down in the plane of the image of FIG. 1 and into and out of the plane of the image of FIG. 1, with up to three or more degrees of freedom.

As shown in FIGS. 1 and 2, the texturizer 140 includes an extension arm 141, which is movable relative to the printing bed 115 and/or the object, a fine motor controller 142 and a gross motor controller 143. The extension arm 141 is supportable on the track 117 as described above and can have multiple joints, extendable features and controllable motors. The fine motor controller 142 includes a heating element 144, which can include or be provided as a heat gun (similar to the instrument used for desoldering components with respect to a printed circuit board) that can blow hot fluids or air toward the object to bring a temperature of the object up to a predefined temperature, one or more texturizing tools 145 and a fine motor 146. The fine motor 146 can include or be provided as a six-axis stepper motor and is operable to control respective positions and orientations of the heating element 144 and the one or more texturizing tools 145 relative to the object. That is, the fine motor 146 is configured to move and/or rotate the heating element 144 and the one or more texturizing tools 145 in multiple directions, such as side-to-side and up and down in the plane of the image of FIG. 1 and into and out of the plane of the image of FIG. 1, with up to three or more degrees of freedom. The gross motor controller 143 is interposed between the extension arm 141 and the fine motor controller 142 and is operable to control a position and an orientation of the fine motor controller 142 relative to the extension arm 141. To this end, the gross motor controller 143 can include a six-axis stepper motor and can be configured to move and/or rotate the fine motor controller 142 relative to the extension arm 141 in multiple directions, such as side-to-side and up and down in the plane of the image of FIG. 1 and into and out of the plane of the image of FIG. 1, with up to three or more degrees of freedom.

The texturizer 140 can further include a head sensor array 147 and a tool sensor array 148.

The head sensor array 147 is configured to sense one or more conditions of an object, such as its size and dimensions as well as its internal and surface temperatures. For example, the head sensor array 147 can include or be provided as one or more optical and mechanical sensors and one or more infrared (IR) sensors. The one or more optical and mechanical sensors can determine the size and shape of the object and one or more IR sensors can determine a surface temperature of the object. The size and shape of the object can be used in the control of the track 117, the fine motor controller 142 and the gross motor controller 143 so as to bring the currently used one of the one or more texturizing tools 145 into an appropriate position relative to the object. Also, each of the one or more texturizing tools 145 can potentially require that the surface temperature of the object be set at one or more various surface temperatures. As such, the sensing of the surface temperature of the object by the IR sensors can be used to determine whether the surface temperature of the object is set at an appropriate level for the currently used one of the one or more texturizing tools 145. If this is not the case, the heating element 144 can be operated to adjust the surface temperature of the object (along with the control of the track 117, the fine motor controller 142 and the gross motor controller 143 being executed so as to bring the heating element 144 into position to adjust the surface temperature of the object).

The tool sensor array 148 is configured to sense one or more conditions of the one or more texturizing tools 145. For example, the tool sensor array 148 can include or be provided as one or more optical and mechanical sensors and one or more infrared (IR) sensors. The one or more optical and mechanical sensors can determine the position and orientation of the one or more texturizing tools 145 that is currently in use so that it can be repositioned if necessary and the one or more IR sensors can determine an operating temperature of the one or more texturizing tools 145 that is currently in use so that it can remain in use if its operating temperature is within normal parameters or paused if its operating temperature needs to be adjusted.

In accordance with embodiments, the fine motor controller 142 and the gross motor controller 143 can both include control or processing systems. These control or processing systems can include processing units, memory units, servo control units that can operate the various components of the fine motor controller 142 and the gross motor controller 143 in accordance with commands issued by the processing units, networking units by which the processing units are communicative with the head sensor array 147, the tool sensor array 148 and external systems and input/output (I/O) busses by which the processing units, the memory units, the servo control units and the networking units are communicative. The memory units each have executable instructions stored thereon which are readable and executable by the processing units. When the executable instructions are read and executed by the processing units, the executable instructions cause the processing units to at least generate and issue the commands to the servo control units.

In accordance with embodiments of the present invention and as shown in FIG. 2, the one or more texturizing tools 145 can include an additive manufacturing tool 150 and one or more subtractive manufacturing tools 160. The additive manufacturing tool 150 can be used to additively manufacture textured and other features on an object by one or more additive manufacturing processes (e.g., extrusion). The heating element 144 can be used in concert with the additive manufacturing tool 150 to whatever extent that the additive manufacturing processes require temperature control and in concert with the currently used one of the one or more subtractive manufacturing tools 160 to whatever extent that the subtractive manufacturing requires temperature control. The one or more subtractive manufacturing tools 160 can include or be provided as CNC machine milling heads, knives, stamps, etc., and the currently used one of the one or more subtractive manufacturing tools 160 can be used simultaneously with the heating element 144 and/or the additive manufacturing tool 150.

In accordance with further embodiments of the present invention and as shown in FIG. 2, the fine motor controller 142 can include a tool swapping system 170 and an additional fine motor 180. The tool swapping system 170 can be configured to position the currently used one of the one or more subtractive manufacturing tools 160 in a current use position and to stow the others of the one or more subtractive manufacturing tools 160. As used herein, the current use position can be characterized in that the additive manufacturing tool 150, the heating element 144 and the currently used one of the one or more subtractive manufacturing tools 160 are disposed in a substantially linear arrangement facing toward the object. The tool swapping system 170 can include a tool swapping mechanism 171. During use, in an event the currently used one of the one or more subtractive manufacturing tools 160 needs to be swapped out, the fine motor controller 142 can be retracted from the object and the tool swapping mechanism 171 can rotate the currently used one of the one or more subtractive manufacturing tools 160 out of the current use position and into a stowed position and can additionally rotate a new one of the one or more subtractive manufacturing tools 160 into the current use position. The additional fine motor 180 can be operable to control movements, such as rotations, of the currently used one of the one or more subtractive manufacturing tools 160 in the current use position.

Figure 3:
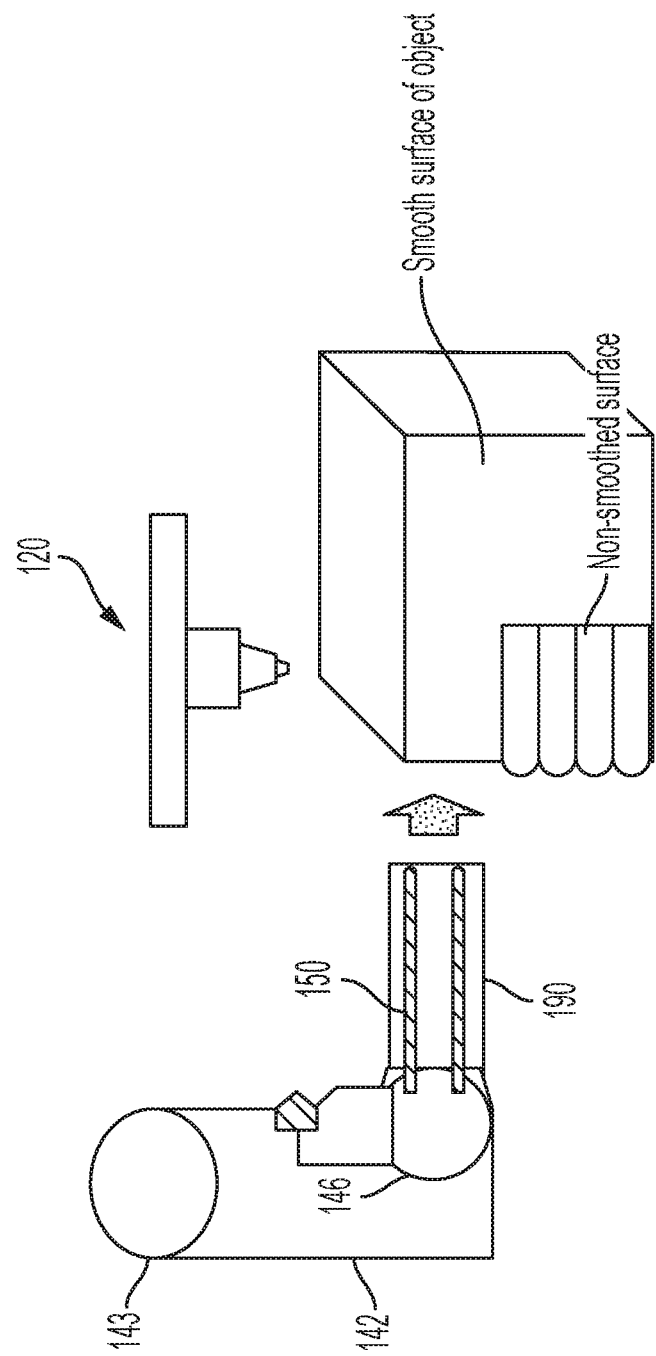
FIG. 3 is an enlarged side view of a texturizer of the additive manufacturing device in accordance with additional alternative embodiments of the present invention.

In accordance with embodiments of the present invention and as shown in FIG. 3, the one or more texturizing tools 145 can include an additive manufacturing tool 150 as described above and a smoothing tool 190 that can be operable simultaneously with the additive manufacturing head 120 and the additive manufacturing tool 150.

Figure 4:
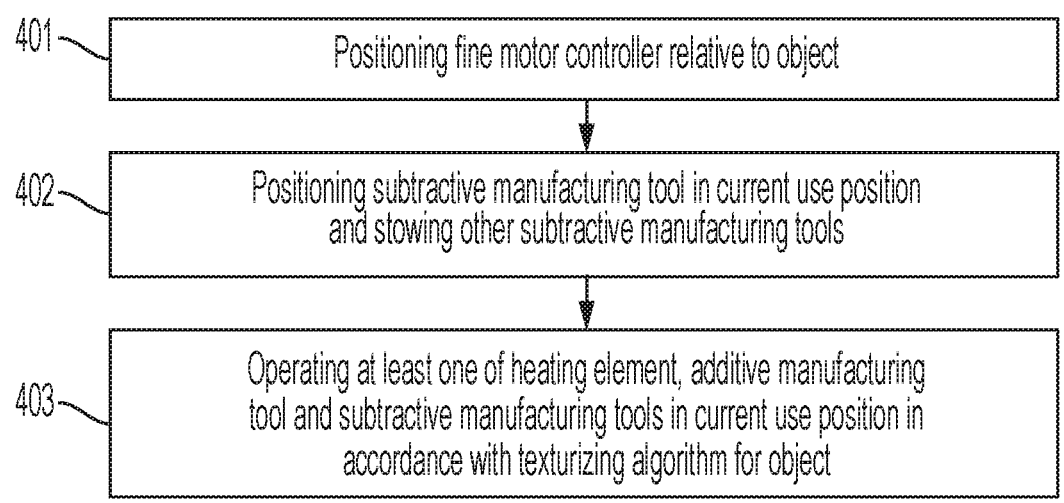
FIG. 4 is a flow diagram illustrating a method of operating a texturizer of an additive manufacturing device in accordance with embodiments of the present invention.

With reference to FIG. 4, a method of operating the texturizer 140 of the additive manufacturing device 101 as described above is provided. As shown in FIG. 4, the method includes positioning the fine motor controller 142 relative to an object (401), positioning one of the one or more subtractive manufacturing tools 160 in the current use position and stowing the others of the one or more subtractive manufacturing tools 160 (402) and operating at least one of the heating element 144, the additive manufacturing tool 150 and the one of the one or more subtractive manufacturing tools 160 in the current use position in accordance with a texturizing algorithm for the object (403).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A texturizer, comprising:
    an extension arm;
    a fine motor controller comprising a heating element, one or more texturizing tools and a fine motor which is operable to control respective positions and orientations of the heating element and the one or more texturizing tools; and
    a gross motor controller interposed between the extension arm and the fine motor controller and operable to control a position and an orientation of the fine motor controller relative to the extension arm.

2. The texturizer according to claim 1, further comprising a head sensor array configured to sense one or more conditions of an object.

3. The texturizer according to claim 1, wherein the fine motor controller further comprises a tool sensor array configured to sense one or more conditions of the one or more texturizing tools.

4. The texturizer according to claim 1, wherein the one or more texturizing tools comprise:
    an additive manufacturing tool; and
    one or more subtractive manufacturing tools.

5. The texturizer according to claim 4, wherein the fine motor controller comprises a tool swapping system configured to position one of the one or more subtractive manufacturing tools in a current use position and to stow the others of the one or more subtractive manufacturing tools.

6. The texturizer according to claim 4, wherein the fine motor controller further comprises an additional fine motor which is operable to control movements of a currently used one of the one or more subtractive manufacturing tools.

7. The texturizer according to claim 4, wherein the additive manufacturing tool and a currently used one of the one or more subtractive manufacturing tools are simultaneously operable.

8. The texturizer according to claim 1, wherein the one or more texturizing tools comprise a smoothing tool.

9. An additive manufacturing device, comprising:
a housing comprising a printing bed;
an additive manufacturing head configured to additively manufacture an object on the printing bed; and
a texturizer comprising:
an extension arm, which is movable relative to the printing bed;
a fine motor controller comprising a heating element, one or more texturizing tools and a fine motor which is operable to control respective positions and orientations of the heating element and the one or more texturizing tools relative to the object; and
a gross motor controller interposed between the extension arm and the fine motor controller and operable to control a position and an orientation of the fine motor controller relative to the extension arm.

10. The additive manufacturing device according to claim 9, wherein the additive manufacturing head comprises:
an additive manufacturing head element configured to dispense material of the object; and
a curing or hardening element configured to cure or harden the material of the object.

11. The additive manufacturing device according to claim 9, wherein the texturizer further comprises a head sensor array configured to sense one or more conditions of an object.

12. The additive manufacturing device according to claim 9, wherein the fine motor controller further comprises a tool sensor array configured to sense one or more conditions of the one or more texturizing tools.

13. The additive manufacturing device according to claim 9, wherein the one or more texturizing tools comprise:
an additive manufacturing tool; and
one or more subtractive manufacturing tools.

14. The additive manufacturing device according to claim 13, wherein the fine motor controller comprises a tool swapping system configured to position one of the one or more subtractive manufacturing tools in a current use position and to stow the others of the one or more subtractive manufacturing tools.

15. The additive manufacturing device according to claim 13, wherein the fine motor controller further comprises an additional fine motor which is operable to control movements of a currently used one of the one or more subtractive manufacturing tools.

16. The additive manufacturing device according to claim 13, wherein the additive manufacturing tool and a currently used one of the one or more subtractive manufacturing tools are simultaneously operable.

17. The additive manufacturing device according to claim 9, wherein the one or more texturizing tools comprise a smoothing tool which is operable simultaneously with the additive manufacturing head.

18. A method of operating a texturizer of an additive manufacturing device, the method comprising:
positioning a fine motor controller relative to an object, the fine motor controller comprising a heating element, an additive manufacturing tool and one or more subtractive manufacturing tools;
positioning one of the one or more subtractive manufacturing tools in a current use position and stowing the others of the one or more subtractive manufacturing tools; and
operating at least one of the heating element, the additive manufacturing tool and the one of the one or more subtractive manufacturing tools in the current use position in accordance with a texturizing algorithm for the object.

19. The method according to claim 18, wherein the operating comprises simultaneously operating the heating element, the additive manufacturing tool and the one of the one or more subtractive manufacturing tools in the current use position.

20. The method according to claim 18, wherein:
the fine motor controller comprises a smoothing tool, and
the method further comprises operating the smoothing tool simultaneously with an additive manufacturing head of the additive manufacturing device.

* * * * *